No. 819,798. PATENTED MAY 8, 1906.
S. RAY.
HAY AND STRAW PULLER.
APPLICATION FILED OCT. 21, 1905.
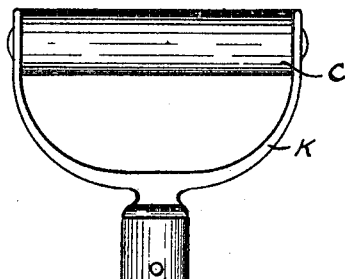
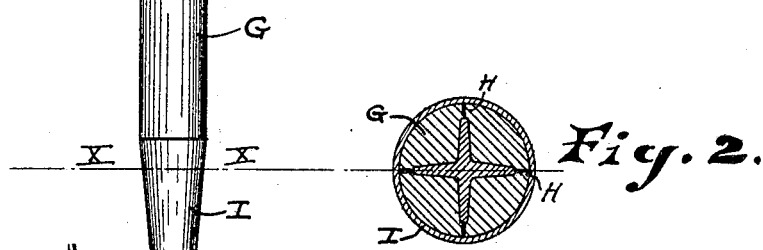
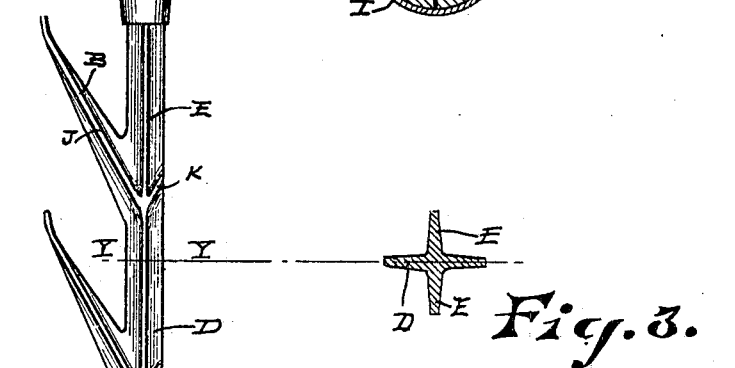
WITNESSES:
INVENTOR
Servin Ray
BY
Erwin & Wheeler
ATTORNEYS.

UNITED STATES PATENT OFFICE.

SEVRIN RAY, OF RACINE, WISCONSIN.

HAY AND STRAW PULLER.

No. 819,798.  Specification of Letters Patent.  Patented May 8, 1906.

Application filed October 21, 1905. Serial No. 283,745.

*To all whom it may concern:*

Be it known that I, SEVRIN RAY, a citizen of the United States, residing at the city of Racine, county of Racine, and State of Wisconsin, have invented new and useful Improvements in Hay and Straw Pullers, of which the following is a specification.

It is a well-known fact that when straw, hay, or other stacked fodder has stood long in the open and the top exposed to rain, snow, and frost it becomes hard and forms a stiff crust, which cannot be readily removed, which crust is preferably left on, as it forms a protecting roof to the dry straw or hay below.

The object of my invention is to provide a device by which the straw, hay, or other fodder may be readily pulled from the side or body of the stack without cutting or displacing the top of the stack or without in any way exposing the remaining fodder to the injurious action of the elements.

The construction of my device is explained by reference to the accompanying drawings, in which—

Figure 1 represents a side view. Fig. 2 represents a transverse section drawn on line X X of Fig. 1, and Fig. 3 represents a transverse section drawn on line Y Y of Fig. 1.

Like parts are identified by the same reference-letters throughout the several views.

My invention comprises, among other things, a penetrating spear A, provided with a series of pulling-hooks B B and an operating-handle C. The spear A preferably comprises a central blade D and two side blades or flanges E E, which serve to strengthen the blade D and make it more rigid. The hooks B are preferably made successively longer from the point F toward the handle, whereby the instrument is more readily inserted into a stack. The shank G is provided with two longitudinal saw-slits H H, formed at right angles to each other for the reception of the upper end of the spear, one of said slits being formed for the central blade D and the other for the two side blades or flanges E.

It will be obvious that the slits H not only provide a convenient means of attaching the spear, but when thus attached it is prevented by said flanges from turning in the shank, as it might otherwise do when the spear and hooks are being turned in a stack.

I is a ferrule of ordinary construction which serves to prevent the shank from splitting. The several pulling-hooks B are provided on their respective sides with strengthening-flanges J, which taper from the spear outwardly to the point of said hooks, while the opposite sides of respective flanges E are provided with a plurality of strengthening-flanges K, which diverge upwardly from the respective side flanges.

It will be understood that when the hay or straw is deposited in a stack it becomes formed into horizontal layers one upon another from the base of the stack to the top.

In using my device it is usual to insert the blade with the pulling-hooks in a horizontal position upon one side thereof, in which position they are more easily inserted between the layers of fodder. When the instrument has been thus inserted, it is given a quarter of a turn, when the hooks will engage the fodder above or beneath the blade, it depending, of course, upon which way the blade is turned, when the hooks thereby will be caused to penetrate the fodder, and when this is done the instrument is withdrawn from the stack and a large amount of fodder will be drawn out with it. It will now be understood that thus turning the instrument between the layers of the fodder would have a tendency to loosen the spear from the shank if the spear were connected with the shank in an ordinary cylindrical socket. This tendency is, however, overcome by connecting the spear to the handle by the device illustrated in Fig. 2, in which the angular flanges on the spear engage the saw-cuts in the shank and prevent the spear from being turned.

To facilitate turning the instrument when inserted in a stack, I preferably provide the shank G with the handle C, which is secured at right angles thereto by the U-shaped bracket K and serves as a lever to facilitate turning the hooks and spear when thus embedded in the stack.

Having thus described my invention, what I claim as new, and desire to secure by Letters Patent, is—

1. In a device for pulling fodder from a stack the combination of a longitudinal blade, an operating-handle and a plurality of pulling-hooks formed on one side of said longitudinal blade.

2. The combination of a longitudinal blade, an operating-handle and a plurality of pulling-hooks formed upon one side of said blade, said hooks being successively longer from the point toward the handle.

3. The combination of a longitudinal blade provided on its respective sides with longitudinal flanges; an operating-handle secured to one end of said blade and a plurality of pulling-hooks secured to one side of said blade, said hooks being successively longer from the point toward the handle, substantially as set forth.

4. The combination of a longitudinal blade provided with longitudinal strengthening-flanges, a plurality of pulling-hooks successively longer from the point toward the handle, each of said hooks being provided with strengthening-flanges and an operating-handle secured to one end of said longitudinal blade.

5. The combination of a longitudinal blade provided upon its respective sides with longitudinal flanges, formed integrally with and at right angles to said blade, an operating-handle, the shank of which is provided with longitudinal slits formed at right angles to each other for the reception of the longitudinal blade and flanges, said blade being provided with a plurality of pulling-hooks which are successively longer from the point toward the handle, all substantially as and for the purpose specified.

In testimony whereof I affix my signature in the presence of two witnesses.

SEVRIN RAY.

Witnesses:
 CARL RAY,
 E. M. RAY.